(12) United States Patent
Spielvogel et al.

(10) Patent No.: US 11,110,691 B2
(45) Date of Patent: Sep. 7, 2021

(54) COMPOSITE PRODUCT

(71) Applicant: Mubea Carbo Tech GmbH, Salzburg (AT)

(72) Inventors: Bernhard Spielvogel, Moosbach (AT); Christina Theobald, Hallein (AT); Sebastian Schmitz, Salzburg (AT)

(73) Assignee: MUBEA CARBO TECH GMBH, Salzburg (AT)

( * ) Notice: Subject to any disclaimer, the term of this patent is extended or adjusted under 35 U.S.C. 154(b) by 0 days.

(21) Appl. No.: 16/482,371

(22) PCT Filed: Feb. 9, 2018

(86) PCT No.: PCT/EP2018/053353
§ 371 (c)(1),
(2) Date: Jul. 31, 2019

(87) PCT Pub. No.: WO2018/149761
PCT Pub. Date: Aug. 23, 2018

(65) Prior Publication Data
US 2020/0023623 A1    Jan. 23, 2020

(30) Foreign Application Priority Data

Feb. 17, 2017 (CH) ..................................... 00183/17
Aug. 22, 2017 (CH) ..................................... 01045/17

(51) Int. Cl.
*B32B 27/12*    (2006.01)
*B29C 45/14*    (2006.01)
(Continued)

(52) U.S. Cl.
CPC ........ *B32B 27/12* (2013.01); *B29C 45/14508* (2013.01); *B29C 45/14786* (2013.01);
(Continued)

(58) Field of Classification Search
CPC .......... B32B 27/12; B32B 3/266; B32B 7/08; B32B 2307/412; B29C 45/14508;
(Continued)

(56) References Cited

U.S. PATENT DOCUMENTS 3,911,186 A * 10/1975 Trotman ................. B32B 3/266
                                                      428/137
2003/0094728 A1 * 5/2003 Tayebi ..................... B32B 27/12
                                                      264/132
(Continued)

FOREIGN PATENT DOCUMENTS

| CN | 101693414 A | 4/2010 |
| CN | 104228293 A | 12/2014 |
| CN | 104797406 A | 7/2015 |
| EP | 2716441 A1 | 4/2014 |
| JP | H11348191 A | 12/1999 |
| JP | 2010194863 A | 9/2010 |

OTHER PUBLICATIONS

Omnexus, "Transparency", 2015, https://omnexus.specialchem.com/polymer-properties/properties/transparency (Year: 2015).*

(Continued)

*Primary Examiner* — Jasper Saberi
(74) *Attorney, Agent, or Firm* — GrowIP Law Group LLC

(57) ABSTRACT

The invention is directed to a composite product that includes a first layer made from a plastic and a support structure and a layer of fibers arranged between the first layer of plastic and the support structure. The first layer of plastic penetrates the layer of fibers at least at certain locations such that the first layer of plastic is mechanically interconnected with the layer of fibers.

19 Claims, 3 Drawing Sheets

(51) Int. Cl.
- *B32B 3/08* (2006.01)
- *B32B 3/30* (2006.01)
- *B32B 7/08* (2019.01)
- *B32B 7/12* (2006.01)
- *B29C 70/08* (2006.01)
- *B32B 3/26* (2006.01)
- *B29L 9/00* (2006.01)

(52) U.S. Cl.
CPC ............ *B29C 70/08* (2013.01); *B29C 70/086* (2013.01); *B32B 3/08* (2013.01); *B32B 3/266* (2013.01); *B32B 3/30* (2013.01); *B32B 7/08* (2013.01); *B32B 7/12* (2013.01); B29C 45/14811 (2013.01); B29C 2045/14532 (2013.01); B29K 2995/0026 (2013.01); B29L 2009/00 (2013.01); B32B 2262/0269 (2013.01); B32B 2262/103 (2013.01); B32B 2262/106 (2013.01); B32B 2307/412 (2013.01)

(58) Field of Classification Search
CPC ......... B29C 45/14786; B29C 45/14811; B29C 70/08; B29C 70/086
See application file for complete search history.

(56) References Cited

U.S. PATENT DOCUMENTS

| | | | |
|---|---|---|---|
| 2008/0296887 | A1 | 12/2008 | Baggenstos |
| 2009/0202789 | A1* | 8/2009 | Wagner .................. B29C 70/78 428/195.1 |
| 2010/0173134 | A1 | 7/2010 | Khokhlov et al. |
| 2013/0052899 | A1* | 2/2013 | Li .......................... B32B 5/024 442/59 |
| 2014/0186609 | A1* | 7/2014 | Qin .................. B29C 45/14311 428/221 |
| 2014/0377503 | A1 | 12/2014 | Wang et al. |
| 2015/0050485 | A1* | 2/2015 | Wagner .................. B29C 70/30 428/300.7 |

OTHER PUBLICATIONS

Office Action dated Apr. 1, 2020 for Russian Patent Application No. 2019125725.
Chinese Application No. 201880012507, Office Action and Search Report dated Oct. 13, 2020.
The International Search Report (ISR) with Written Opinion for PCT/EP2018/053353 dated Mar. 28, 2019, pp. 1-11.

* cited by examiner

COMPOSITE PRODUCT

CROSS-REFERENCE TO RELATED APPLICATIONS

This application claims the benefit of the filing date of international PCT Application No. PCT/EP2018/053353, filed on Feb. 9, 2018 that in turn claims priority to Swiss Patent Application No. CH 00183/17, filed on Feb. 17, 2017, and to Swiss Patent Application No. CH 01045/17, filed on Aug. 22, 2017, which are hereby incorporated by reference in their entirety.

FIELD OF THE INVENTION

The present invention relates to a composite product and a method for making of such a composite product.

BACKGROUND OF THE INVENTION

Products made from composite material are known from the prior art. They are appreciated not only for their high capacity and comparable low weight but also for their appearance which often is of more importance. However, traditional products made from composite material are often comparatively expensive.

DE102009016213A1 was first published in October 2010 in the name of Audi AG. It is directed to a method that involves arranging thermoplastic foils and a fibrous material such that a multi-layer structure is provided with the foils and a fiber layer. One of the outer sides of a composite material is formed by the foils and the fiber layer is arranged between the foils. A multilayered fiber-thermoplastic-laminar structure material is manufactured from the multi-layer structure of the foils and the fibrous material. The outer side of the composite material forming thermoplastic foils has a thermal expansion coefficient that is less than $70 \times 10^{-6}$ 1/K. The publication describes a multilayered fiber-thermoplastic-laminar structure material including thermoplastic foils and a method for manufacturing an auto body device.

WO08058971A1 was first published in May 2008 in the name of Bond Laminates GmbH. The publication relates to a fiber composite with a matrix of plastic. Reinforcing fibers are embedded in the matrix. A first group of reinforcing fibers is coupled to the matrix by a first fiber-matrix adhesion. A second group of reinforcing fibers is coupled to the matrix by a second fiber-matrix adhesion. The second fiber-matrix adhesion is formed to be less than the first fiber-matrix adhesion. The differential construction of the fiber-matrix adhesion is intended to improve the breaking behavior of the composite in the case of absolute failure.

US2002016121A was first published in February 2002 in the name of Daimler AG. It describes a process for producing a component with an inner fabric which includes layering of at least two layers of fabric one on top of the other. A layer of plastic in powder form or sheet form is introduced between respective pairs of neighboring layers of fabric. The plastic has a melting point corresponding to at most the melting point and/or the decomposing temperature of the fabric layers. The fabric layers and plastic layer are heated and pressed at a pressure greater than atmospheric pressure, during which the plastic layer is at least partially melted. After reaching the desired final form, the partially-melted plastic is cooled, thereby bonding the fabric layers to one another. The cooled plastic is arranged between the layers of fabric and, in particular, at least partially between the fibers of the fabric layers.

DE4106692A1 was first published in September 1992 in the name of Bayer AG. It is directed to fiber reinforced plastic materials that are produced from thermoplastics and reinforcing fabric of distortion-free fibers by means of double-band presses. In the process, a film of thermoplastic melt is applied to the fabric before it is passed into the band press. The fabric structure is locked by cooling the melt to beneath its solidifying point. The fabric is held under tension of at least 3 N/cm when fed into the press by applying a brake to its reel. The fibers can then be monitored for freedom from distortion before being processed.

EP0418772A2 was first published in September 1989 in the name of Hoechst AG. It is directed to a dimensionally stable laminate which has the form of a flat panel, a tube or an unflat three-dimensional shape and comprises a number of superposed, pressed-together thermoplastic films which are biaxially or monoaxially stretched. The individual plastics film is coated at least on one side, but generally on both sides, with sealing layers of which the melting point is lower than the melting point of each of the plastics films. Embedded in the laminate is a reinforcing layer which is provided with open cross-sections and is enclosed on all sides by the sealable polymer of the sealing layers. The polymer fills the open cross-sections of the reinforcing layer from both sides and forms an inseparable bond with the reinforcing layer, which after the thermal press molding, is incorporated in a polymer matrix of the laminate.

WO2006122987 was first published in June 2007 in the name of the same applicant as the herein disclosed invention. WO'987 is directed to a process for the making of a product out of laminated composite material. The process in general comprises preforming at least one layer of material such that it corresponds to a surface of a part, applying layers of fibers to the preformed layer of material and bonding the fibers by a resin to form a laminated composite material. Depending on the field of application, the preformed layer of material can remain on the bonded fibers or can be removed after curing of the resin.

WO13131781 was first published in September 2013 in the name of the same applicant as the herein disclosed invention. WO'781 relates to a method for producing a component from fiber-reinforced composite material. In a first step, a mold is provided and, in a second step, a surface layer is introduced into a cavity of the mold. In a further step, a fiber layer is applied to the surface layer and is cured together with the surface layer to form a first part. Afterwards, the first part is subjected to a check. If the check proceeds positively, a carrier structure is connected operatively to the first part.

Composite materials which rely on an epoxy-based matrix are known from the prior art. These procedures imply a large amount of manual work. Other problems are distortion of the fibers due to resin flow and pressurization during injection, high effort when integrating of add-on part such as brackets, etc. Other difficulties may imply when painting and recycling the parts.

SUMMARY OF THE INVENTION

It is an object of the present disclosure to provide a composite product and a method for making of such a composite product which has the appearance of traditional composite reinforced product but has new properties. A further advantage is that the composite product according to the present disclosure can be made more cost efficient compared to traditional composite products.

Beside comparably low weight and high strength, products made from fiber reinforced material as known from the prior art have an attractive optical appearance. Viewing the reinforcing fibers across an optically transparent protective layer of material arranged on the outside (normally part of the matrix in which the fibers are embedded) is therefore desired by customers. The functionality is less important compared to the optical appearance of visible parts arranged at the outside (e.g. casing, etc.) which are not part of the load bearing structure arranged underneath.

The making of classic fiber reinforced products consisting of a matrix and therein embedded reinforcing fibers is normally related to labor-intensive and therefore expensive process steps. The present disclosure provides a cost effective and efficient method to provide products having the appearance of fiber reinforced composite products as described above but offering new characteristics such e.g. as flexibility.

One aspect of the present disclosure is directed to the fact that the reinforcing fibers are used primarily for reasons of their optical appearance but not for their mechanical characteristics (high strength and stiffness) primarily. Therefore, when embedding the fibers in the surrounding matrix, it is not required to establish the maximum possible adhesive interconnection between the fibers and the matrix. This has the further advantage that problems with different coefficients of thermal expansion can be reduced, respectively completely overcome. When embedding a layer of fibers, preferably in the form of a textile comprising a network of fibers, in the matrix, the matrix surrounds the fibers completely, but not only along the outer edge of the textile but also across the textile e.g. by bridges extending across fine openings (pores). Unlike the prior art, a composite product made according to the present disclosure could be made with one layer of fibers only and the fibers need not be completely embedded in the matrix as the purpose is different.

A composite product according to the present disclosure typically comprises a first layer of plastic material (hereinafter plastic), a support structure and a layer of fibers arranged therebetween (i.e., arranged between the first layer of plastic material and the support structure). If appropriate, more than one layer of fibers can be applied. The term plastic as used hereinafter for at least one of the layers and/or a coating thereof is primarily directed to a material comprising a wide range of synthetic or semi-synthetic organic compounds that can be molded into solid objects, respectively at least once plasticized by energy. Good results can be achieved by transparent polyamide, e.g. PA12 or a compound thereof, which provides a good transparency and offers the ability of glossy surfaces. The thickness of the first layer of plastic can vary and does not necessarily have to be constant along the layer of fibers. In a preferred variation, the network of fibers as mentioned above is preferably a regular network of rectangular or close to rectangular woven bundles of unidirectional fibers. The first layer of plastic penetrates the layer of fibers at least at certain locations such that the first layer of plastic is mechanically interconnected with the layer of fibers. Thus, relative movements between the first layer of plastic and the layer of fibers are restricted at least at certain locations. In particular, relative movements within the interfacial area between the first layer of plastic and the layer of fibers are at least locally restricted. In a preferred variation, the network of fibers as mentioned herein is preferably a regular network of rectangular or close to rectangular woven bundles of unidirectional fibers. Alternatively or in addition, non-regularly arranged fibers can be used depending on the effect to be achieved. An advantage of the invention can be seen in the fact that the final products can be made resistive but still deformable. A further advantage is that due to the material composition the products can easily be recycled.

A particularly durable fixation/positioning of the layer of fibers may be obtained if the support structure comprises a second layer of plastic. The second layer of plastic may at least partially align with the layer of fibers. Alternatively or in addition, the support structure may also comprise a second layer made e.g. from a metal and/or from a composite structure and/or from a foam. In some variations of a composite product according to the present disclosure, the support structure may also be a second layer of plastic.

According to a variation of the disclosure, the first layer of plastic and the support structure are interconnected to each other across the layer of fibers. If the support structure comprises a second layer of plastic—or a second layer made from a different type of material—the second layer of plastic (respectively different type of material) may be interconnected to the first layer of plastic across the layer of fibers.

According to a variation of the present disclosure, the layer of fibers may comprise a textile comprising a regular and/or an irregular network of fibers. The textile may include at least one of uniaxial fabric, biaxial fabric, triaxial fabric, honeycomb fabric, knitted fabric, and nonwoven fabric.

Alternatively or in addition, the network of fibers can be at least partially an irregular network of fibers. In a regular network, the bundles of fibers form a warp and a weft of the textile. Different patterns are possible depending on the field of application and the optical appearance to be achieved. If appropriate small openings (holes) are foreseen between at least one of the warp and the weft to form bridges as described hereinafter. Good results can be achieved by using fibers that include one or more of carbon fibers, Kevlar fibers, metallic fibers, and polymeric fibers. Combinations of multiple types of fibers are possible within the context of the present invention. Alternatively or in addition, color fibers, e.g. colored glass fibers, can be used to achieve an optical effect.

In a variation of the present disclosure, the layer of fibers comprises loose fibers. In a variation of the disclosure, the layer of fibers comprises dry fibers.

If appropriate, the fibers of the layer of fibers can be bonded at least partially to each other by a bonding agent.

In a variation of a composite structure according to the present disclosure, the first layer of plastic and the support structure are interconnected to each other by several bridges arranged in openings extending across the layer of fibers. In a variation of the present disclosure, the bridges may at least partially be made from bridging fibers made from a plastic material and arranged in the layer of fibers. Good results may be obtained if the bridging fibers are at least partially made from a thermoplastic configured to establish chemical bonds with first layer of fibers and/or the support structure when being heated. Good results may be obtained if bridging fibers are at least partially made from the same material as the first layer of plastic and/or the support structure and/or the second layer of plastic (if present).

In a variation of the disclosure in which the support structure comprises a second layer of plastic, good results may be obtained if the first and the second layer of plastic are interconnected to each other by several bridges arranged in openings extending across the layer of fibers.

Alternatively or in addition, the first layer of plastic and the support structure (respectively the second layer of plastic, if present) may be bonded to each other by the fibers of the layer of fibers.

In a variation of a composite structure according to the present disclosure, the first layer of plastic and/or the support structure are at least partially made from a thermoplastic material.

The first layer of plastic and/or the support structure and/or the second layer of plastic (if present) may be made from the same or from a different plastic.

Good results may be obtained if the first layer of plastic and the support structure (respectively the second layer of plastic, if present) are interconnected to each other by welding. Alternatively or in addition, the support structure comprises a second layer of plastic that is interconnected to the first layer of plastic by welding.

In a variation of a composite product according to the present disclosure, the first layer of plastic and the support structure (respectively the second layer of plastic, if present) are interconnected to each other by injection molding. Good results may be obtained if the support structure comprises a second layer of plastic that is interconnected with the first layer of plastic by injection molding.

In a variation of a composite structure according to the present disclosure, the first layer of plastic and/or the support structure are coated by a coating. Good results may be obtained if the support structure comprises a second layer of plastic that is coated by a coating. A coating may comprise an adhesive agent.

For some applications, the first layer of plastic and/or the support structure (respectively the second layer of plastic, if present) may be at least partially optically transparent, such that the fibers of the layer of fibers are at least partially visible from the outside.

If the support structure comprises a second layer of plastic, good results may be obtained if the second layer of plastic is at least partially optically transparent. In a variation of the disclosure, the layer of plastic arranged from a viewer's point of view on the outside is more optically transparent than the other layer of plastic arranged on the inside.

Alternatively or in addition, the layer of plastic arranged on the inside may be coated and/or tinted by a color. According to a variation of the present disclosure, the layer of plastic arranged on the inside may be a light conductor or may comprise means for conduction of light configured to emit light to the layer of fibers. Thus, curing of a resin or adhesive agent may be induced and/or illumination of the layer of fibers and/or the layer of plastic on the outside may be enabled during service/application of the composite structure.

In a variation of the composite product according to the present disclosure, several bridges may be arranged adjacent to junctions of the network of fibers. The bridges may be arranged in a regular and/or irregular pattern.

The bridges may be made by thermoplastic deformation of the material of the first and/or the second layer of plastic (respectively the support structure).

In a variation of the present disclosure, an additional part may be interconnected to the first layer of plastic and/or the second layer of plastic if present. Good results may be obtained if the additional part is interconnected by injection molding.

According to a variation of the present disclosure, the support structure may comprise a metal and/or a plastic foam and/or composite structure.

Good results may be obtained, if at least one adhesive layer is arranged between the first layer of plastic and the layer of fibers and/or between the support structure and the layer of fibers. If the support structure comprises a second layer of plastic, an adhesive layer may be arranged between the second layer of plastic and the layer of fibers.

According to a variation of the disclosure, the adhesive layer comprises an adhesive agent that is applied on at least parts of the layer of fibers. Good results for certain types of layers of fibers may be obtained if the adhesive agent is a spray adhesive. The adhesive layer may be a volatile liquid that at least temporarily establishes an adhesive connection.

In a variation of the disclosure, the layer of fibers comprises a first component of a two-component adhesive and the first layer of plastic and/or the support structure (and/or a second layer of plastic, if present, as described herein) may comprise a corresponding second component of two-component adhesive.

In a variation of the two components, the adhesive layer comprises an unwoven fabric and/or a web having adhesive properties.

In a variation of the present disclosure, the first layer of plastic comprises protrusions that penetrate the layer of fibers. Alternatively or in addition, the support structure (or a second layer of plastic being part of the support structure) may comprise protrusions that penetrate the layer of fibers. Thus, the first layer of plastic and/or the support structure may be mechanically interlocked with the layer of fibers in order to at least reduce relative movements between the layer of fibers and the first layer of plastic and/or the support structure. In a variation of the disclosure, the protrusions are made from the same material as the first layer of plastic, respectively the support structure. Good results may be obtained if the at least one protrusion is formed by an injection molding process.

In a variation of the disclosure, multiple protrusions are arranged at the face adjacent to the layer of fibers of the first layer of plastic and/or the support structure. At least some of the multiple protrusions may be arranged such that their positioning corresponds to certain structural features of the layer of the fibers. Thus, alignment and draping of the layer of fibers with respect to the first layer of plastic and/or the support structure may be assisted.

Alternatively or in addition, the first layer of plastic may comprise a coating arranged to increase interconnection between the first layer of plastic and the layer of fibers. The coating may be a thermoplastic layer.

Good results may be obtained, if the first layer of plastic and/or the support structure are made by injection molding and/or deep drawing and/or blow molding. If the support structure comprises a second layer of plastic, it may be made by injection molding and/or deep drawing and/or blow molding.

A composite product according to a variation of the disclosure comprises a first layer made from a plastic material and a second layer made from the same or a different plastic and a layer of fibers arranged therebetween (i.e., between the first layer and the second layer). If appropriate, more than one layer of fibers can be applied. If appropriate, the second layer can be replaced by a rigid part which is more solid than a layer. The thickness of the first and/or the second layer can vary and does not necessarily have to be constant along the layer of fibers.

The first and the second layer of plastic are interconnected directly to the fibers or part thereof (e.g. one side only) and/or to each other by several bridges arranged in openings extending across the textile. As mentioned above, it is not the primary aim to establish the maximum possible interaction between the fibers of the layer of fibers and the first layer, respectively the support structure or second layer of plastic. In a preferred variation, several bridges are arranged adjacent to junctions of the network of fibers. The bridges can be arranged in a regular and/or irregular pattern. The bridges can be made by thermoplastic deformation of the material of the first and/or the second layer as described hereinafter in more detail.

The first and/or the second layer of plastic (respectively support structure) are preferably made by injection molding and/or deep drawing and/or blow molding or a combination thereof. The thickness can be constant or variable. From a viewer's point of view, at least on the inside the layer of material (respectively plastic) does not necessarily need to be a layer as such. It can have a different shape or forming part of another element. The first and the second layer of plastic (respectively the support structure) can be formed simultaneously having a common interaction surface. If appropriate, an additional part can be interconnected to the first and/or the second layer of plastic (respectively the support structure), e.g. by injection molding. When applying the fibers, the first and the second layer of material/plastic are normally 3-dimensionally shaped, wherein their 3-dimensional shape in general corresponds to the shape of the final product or is close to it.

Preferably the first and/or the second plastic (respectively the material of the support structure) is a thermoplastic. Thereby the first and the second layer of plastic (respectively the support structure) can be bonded to each other and/or the layer of fibers after heating to a predefined temperature, e.g. a temperature at which at least one of the materials is at least partially melted, and pressing them together. The pressing together can occur during heating of the at least one layer of thermoplastic (respectively support structure of thermoplastic) and results in a controlled deformation. The first and the second layer of material/plastic (respectively support structure) can be interconnected to each other by welding. Alternatively or in addition, at least one layer of material/plastic (respectively the support structure) can be coated by an additional layer of thermoplastic which is at least partially melted during processing. The additional layer can have a lower melting temperature than the layer of plastic (respectively the support structure) to which it is applied. Alternatively or in addition, the first and the second layer (respectively the support structure) are interconnected to each other by injection molding.

If appropriate, the first and/or the second layer of material/plastic (respectively the support structure) can be coated on the inside and/or the outside, e.g. by a thermoplastic coating as describe above and/or by a paint. Preferably the first and/or the second layer of plastic (respectively the support structure) are optically transparent, such that the fibers are visible from the outside (therefore with respect to a mounting position, at least the outer layer is at least partially optically transparent). The opposite inner layer preferably is at least partially less transparent e.g. in that it is tinted and/or covered by a layer of paint. Thereby the optical effect of the fibers on the outside can be improved as optical defects can be hidden.

A method for making of a composite product according to the present disclosure typically comprises the method steps: providing a first layer of plastic; providing a layer of fibers; providing a first mold part; providing a second mold part; arranging the layer of fibers between the first layer of plastic and the second mold part; arranging the first layer of plastic between the first mold part and the second mold part; bringing together the first and the second mold part; inducing energy such that a part of the first layer of plastic penetrates the layer of fibers. Good results may be obtained if thermal energy is applied in order to induce local melting of a first layer of plastic (and/or second layer of plastic if present) and support penetration of molten plastic in the layer of fibers. Local heating may be obtained by thermal conduction. Alternatively or in addition, depending on the type of fibers used induction heating of the fibers and/or heating by absorption of light by at least some fibers may be applied. The layer of fibers may include a network of fibers.

In a variation of a method for making a composite product according to the present disclosure, a second layer of plastic is provided. The layer of fibers is arranged between the first and the second layer of plastic and the first and the second layer of plastic are interconnected across the layer of fibers. Said interconnecting may be obtained by inducing energy into the second layer of plastic.

Good results may be obtained if a chemical bond interconnects the first and the second layer of plastic (if present) with each other. Alternatively or in addition, the first and the second layer of plastic may be interconnected by form fitting.

For some applications, the first layer of plastic may comprise an adhesive coating arranged to interconnect with the layer of fibers when brought into physical contact with the layer of fibers. Alternatively or in addition, if the support structure comprises a second layer of plastic, the second layer of plastic comprises an adhesive coating arranged to interconnect with the layer of fibers, when brought into physical contact with the layer of fibers.

Alternatively or in addition, the first layer of plastic and/or the second layer of plastic (if present) comprises at least one protrusion configured to penetrate the layer of fibers. Thus alignment of the layer of fibers with respect to the first and/or the second layer of plastic can be improved.

Alternatively or in addition, a method for making a composite product according to the present disclosure may comprise the method step of arranging an adhesive layer on one side of the layer of fibers. Thus, an at least temporary interconnection between the layer of fibers and the first layer of plastic and/or the layer of fibers and the support structure (respectively second layer of fibers) may be obtained. Good results may be obtained if such an adhesive layer comprises a fabric and/or a foil. For some applications, the adhesive layer may comprise at least one protrusion configured to penetrate the layer of fibers. By this, for certain types of layers of fibers the interconnection may be improved. An adhesive layer as described herein does not have to extend over the whole interfacial area between layer of fibers and an adjacent first and/or second layer of plastic or support structure.

In a variation of a method for making a composite product according to the present disclosure, in a method step a support structure is applied to the layer of fibers by means of injection molding. Such a support structure may comprise a second layer of plastic.

A variation of a method for making of a composite product according to the disclosure comprises the following method steps: Providing a first layer of plastic; providing a second layer of plastic; arranging a layer of fibers comprising a network of fibers between the first and the second layer of material; and interconnecting the first and the second layer of material across the fibers of the textile material. The first and the second layer are normally 3-dimensionally shaped and at least partially correspond to each other such that the layer of fibers can be arranged in-between.

For each of the layers of plastic a forming tool can be provided. Under certain conditions, e.g. if at least one of the layers is not too thick, the same forming tool can be used. Appropriate forming tools can include the following tools or a combination thereof: deep drawing tool, injection molding tool, and stretch molding tool.

The interconnection between the first and the second layer can be preferably established by forming of bridges extending between the first and the second layer of material in openings in the layer of fibers thereby bonding the first and the second layer of material together. The first and/or the second layer of material are preferably made from a thermoplastic material and the bridges consist at least partially out of the same material. The first and the second layer are bonded to each other by melting of the material of the first and/or the second layer.

Good results can be achieved when the first and the second layer of material are 3-dimensionally shaped before the fibers are applied. The 3-dimensional shape in general corresponds to the shape of the final product or is substantially close. The fibers are then applied on at least one of the layers. In a further step, the other layer is applied and the fibers are enclosed. If appropriate, means to fix the fibers on the layer can be foreseen. For example, the layer can comprise mechanical fixation means to hold the fibers in place. The fixation means are formed such that they disappear, when the first and the second layer of material are bonded to each other.

The first and/or the second layer of material can have a variable thickness. Normally the layer from a viewer's point of view arranged on the outside of the final product is thinner than the layer arranged on the inside (i.e., the side normally not visible to a viewer). Good optical appearance can be achieved when at least the layer arranged on the outside has a thickness in the range of 0.4 to 1.0 mm. This can be achieved by layers which are deep drawn or blow molded.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE DRAWINGS

The herein described embodiments will be more fully understood from the detailed description given herein below and the accompanying drawings which should not be considered the features described in the appended claims. The drawings show:

DESCRIPTION OF EMBODIMENTS

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
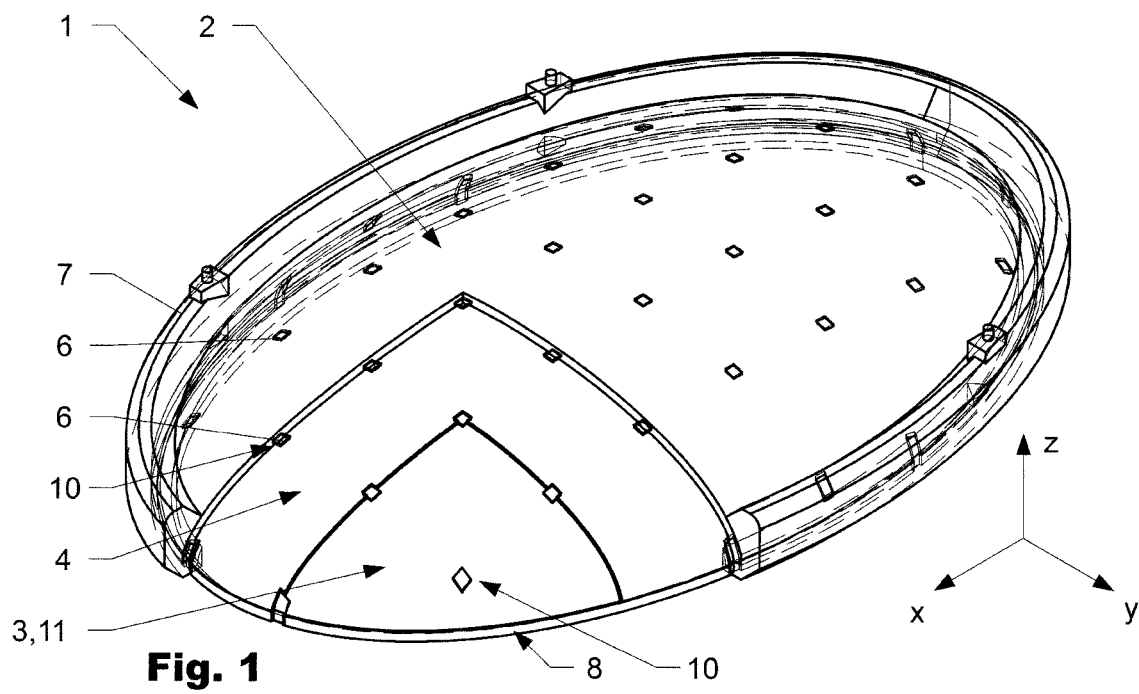
FIG. 1 A composite product according to the present disclosure in a perspective view and partially cut.

FIG. 1 shows a composite product 1 in a perspective view and in a partially cut manner. The composite product 1 comprises a first layer of plastic 2 and a second layer of plastic 3 and a layer of fibers 4 arranged therebetween (i.e., between the first layer of plastic 2 and the second layer of plastic 3) and the layer of fibers includes a network of fibers (not shown in detail). The network of fibers preferably is a regular network of rectangular or close to rectangular woven bundles of unidirectional loose fibers. The bundles of fibers are forming a warp and a weft of a textile. In the composite product 1 as shown, the first and the second layer of plastic 2, 3 are interconnected (bound) to each other across the layer of fibers 4. If appropriate, small openings (holes) are provided between at least one of the warp and the weft to form bridges 6 between the first and the second layer of plastic 2, 3. The bridges 6 are arranged in related openings 10 in the layer of fibers 4 and can have a regular and/or a non-regular arrangement and can vary in size. In the drawings, the openings 10 are only schematically indicated by small rectangular holes. However, the bundles of fibers may also be arranged such that they form a knitted, biaxial, triaxial, or honeycomb (woven) fabric.

In a preferred variation, at least one of the first or the second layer of plastic 2, 3 is made from thermoplastic material. This offers the opportunity that the first and the second layer of plastic 2, 3 can be bonded to each other and/or the layer of fibers 4 by heating the thermoplastic material and pressing the layers 2, 3, 4 together in an appropriate tool.

For the making of a composite product 1 a first layer and a second layer of plastic 2, 3 are provided. Good results can be achieved when the first and the second layer 2, 3 are three dimensionally shaped corresponding at least partially to the final product. The layer of fibers 4 is then draped on the first and/or the second layer of plastic 2, 3, such that no unwanted wrinkles result. In a further step, the other layer of plastic 2, 3 is arranged opposite on the layer of fibers 4. In a next step, the first and the second layer of plastic 2, 3 are interconnected (bonded) to each other across the layer of fibers 4 forming an assembly. The first and second layer of plastic 2, 3 differ in shape in order support draping of the layer of fibers during bonding of the first and the second plastic layer.

The first and the second layer of material 2, 3 are interconnected directly to the fibers or part thereof (e.g. one side only) and/or to each other by several bridges 6 arranged in openings extending across the textile. The bridges 6 are arranged and sized such that they are preferably not noticed by a viewer from the outside. As mentioned above, it is not the primary aim to establish the maximum possible interaction between the fibers of the layer of fibers 4 and the first, respectively the second layer of plastic 2, 3.

If appropriate at least one auxiliary part 7, here in the form of a frame extending along and encompassing an edge 8, can be interconnected to the assembly of the first and the second layer of material 2, 3 and the layer of fibers 4. The auxiliary part 7 can be attached to the assembly, for example, by injection molding which results in a firm interconnection with the elements of the assembly.

Figure 2:
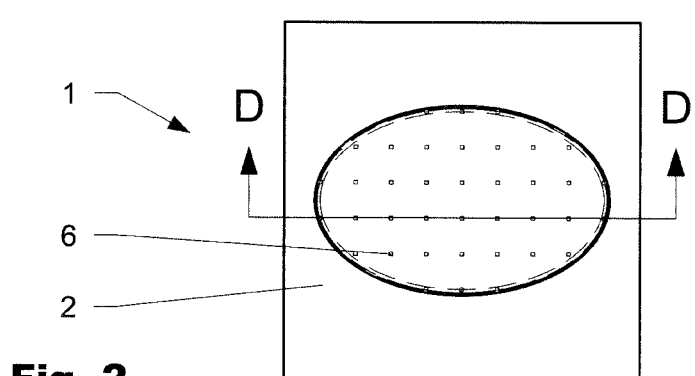
FIG. 2 The composite product according to FIG. 1 in a top view.
Figure 3:
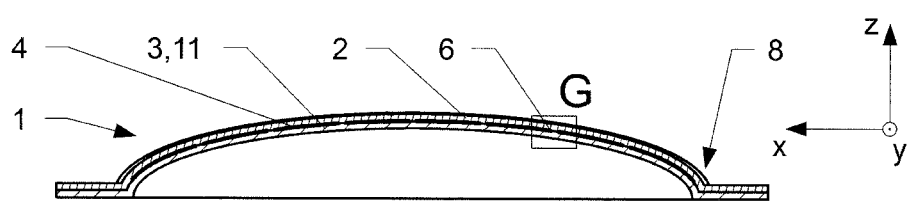
FIG. 3 A section view along section line DD of FIG. 2.

In FIG. 2 the assembly is shown in a top view and in FIG. 3 in a section view along section line DD according to FIG. 2. The assembly is shown in an early stage of production as the first and the second layer of plastic 2, 3 are not yet trimmed. As visible the first and the second layer of plastic 2, 3, as well as the layer of fibers arranged therebetween, are 3-dimensionally shaped. It should be understood that the present disclosure is not limited to the herein shown shape. The first and/or the second layer of material 2, 3 are preferably made by injection molding and/or deep drawing and/or blow molding or a combination thereof. The first and the second layer can be formed simultaneously following the contour of each other. When applying the fibers of the textile 4 the first and the second layer of material are normally 3-dimensionally shaped, where their 3-dimensional shape in general corresponds to the shape of the final product or is substantially close.

Figure 4:
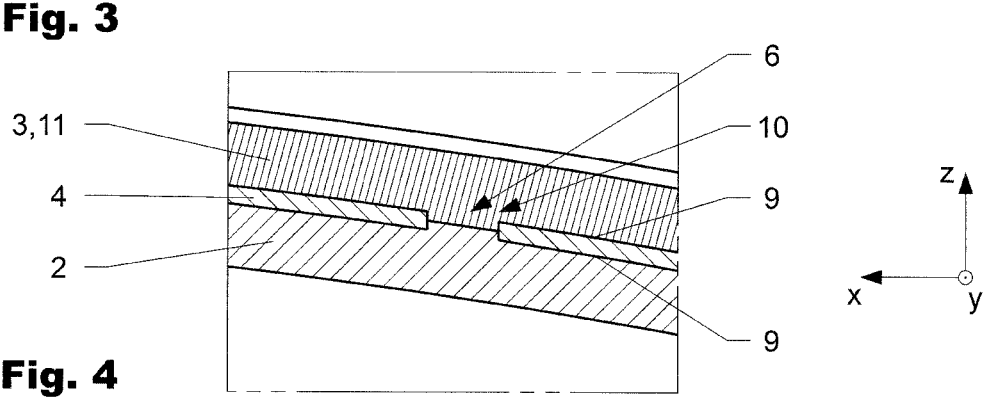
FIG. 4 Detail E according to FIG. 3.

FIG. 4 shows detail E of FIG. 3 in a magnified manner. As it can be seen schematically, the first and the second layer of plastic 2, 3 are interconnected to each other by bridges 6 which extend across the layer of fibers 4 in a regular or irregular manner. Although the cross section of all bridges 6 are similarly shown, in reality this will most likely not be the case. The bridges 6 are formed from both sides by melting of material of the first and the second layer of material 2, 3 and thereby forming an upper and a lower part of the bridge. Alternatively or in addition, the bonding takes place by interaction of the first and second layer and the layer of fibers 4 along an interaction surface 9.

Figure 5:
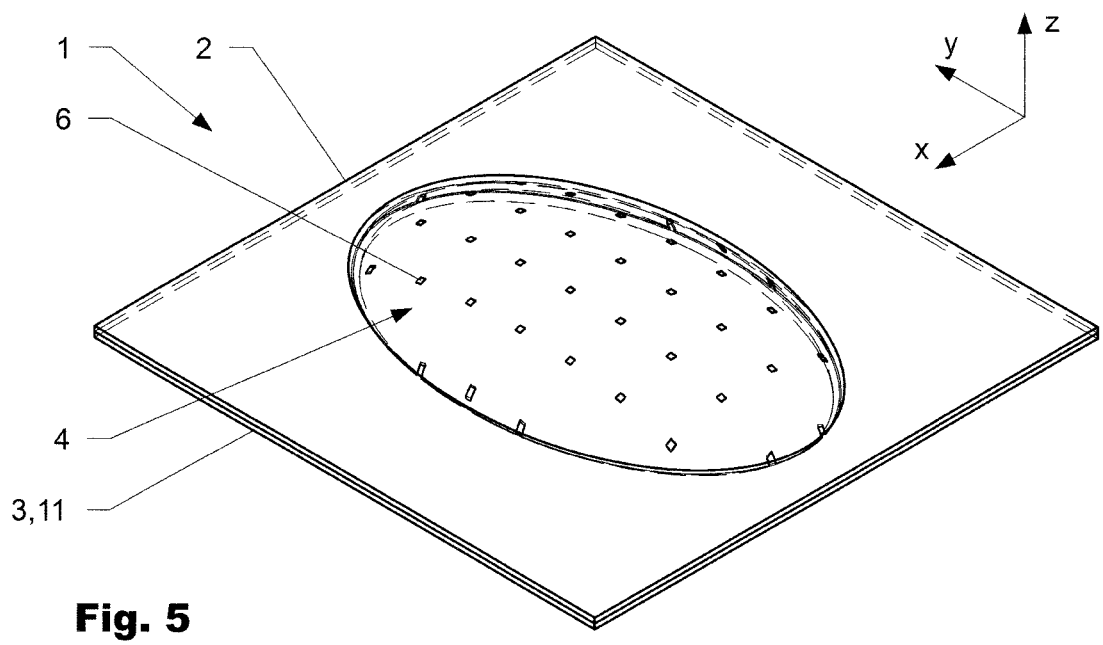
FIG. 5 An intermediate product.

FIG. 5 shows the assembly comprising the first layer of plastic 2, the second layer of plastic 3 and the layer of fibers bonded to each other. As it can be seen in this stage, the first and the second layer of plastic 2, 3 are not yet trimmed to the layer of fibers 4 and extend above it in a lateral direction. In a process step (not show in detail), the first and the second layer 2, 3 are trimmed to the edge 8. Depending on use of the final product the edge 8 can be encompassed by an auxiliary part 7 as shown in FIG. 1.

Figure 6:
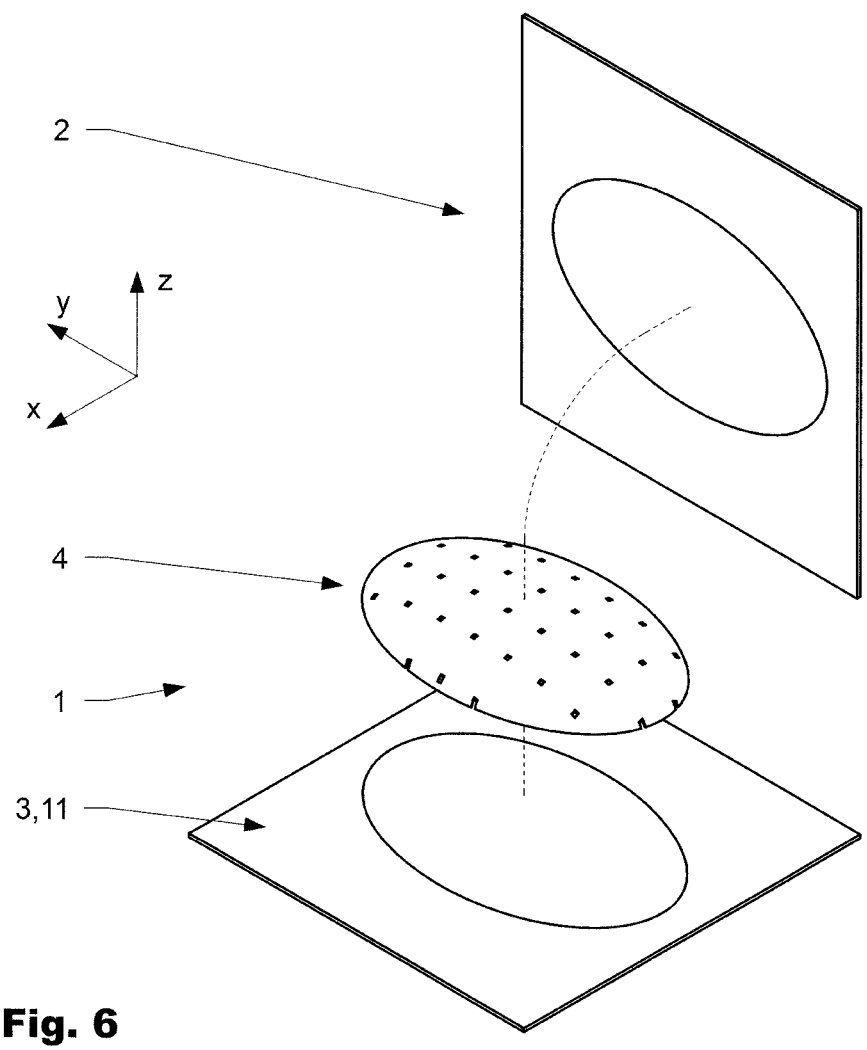
FIG. 6 A process step for making of a composite product according to FIG. 1.

FIG. 6 is schematically showing process steps of making of an assembly as described above: A first layer of plastic 2 and a second layer of plastic 3 are provided. Both are 3-dimensionally shaped before the layer of fibers 4 is applied corresponding at least partially to the geometry of a final product to be made. As visible, a layer of fibers 4 comprising a network of fibers is arranged between the first and the second layer of plastic 2, 3 and encloses the layer of fibers 4 schematically indicated by a line. In a further process step, the first and the second layer of material 2, 3 are interconnected to each other across the layer of fibers 4, e.g. by bonding to the fibers of the layer of fibers 4 and/or bridges 6 extending across related openings 10 arranged in the layer of fibers 4. In a preferred variation, the bridges 6 are formed by at least partially melting the material of the first and or the second layer of plastic 2, 3.

Figure 7:
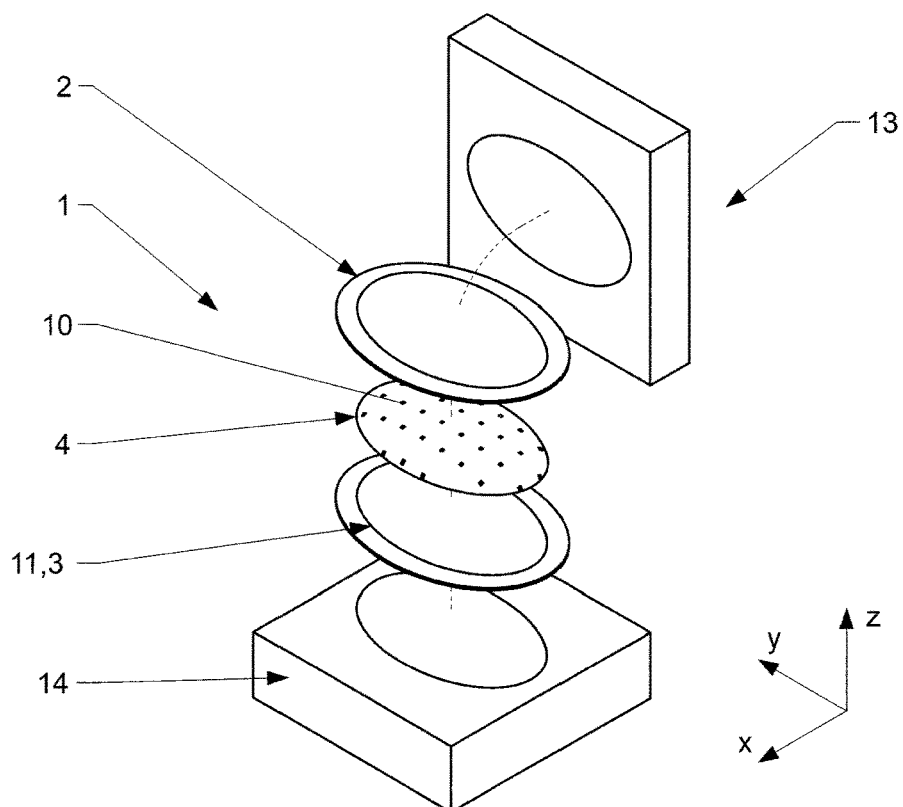
FIG. 7 A process step for making of a variation of a composite product according to the present disclosure.

FIG. 7 schematically shows process steps of a variation of a process of making an assembly as described above: A first layer of plastic 2 and a support structure 11, embodied as a second layer of plastic 3, are provided. Both are 3-dimensionally shaped before the layer of fibers 4 is applied and the shape corresponds at least partially to the geometry of a final product to be made. As visible, a layer of fibers 4 is arranged between the first layer of plastic 2 and the support structure 11—respectively the second layer of plastic 3—and encloses the layer of fibers 4 schematically indicated by a line. In a further process step, the first and the second layer of plastic 2, 3 and the layer of fibers 4 are arranged between a first and a second mold part 13, 14. In a further process step, the first and the second mold part 13, 14 are brought together. In a further process step, energy is induced such that part of the first and the second layer of plastic 2, 3 is melted and the first and the second layer of material 2, 3 are interconnected to each other across the layer of fibers 4, e.g. by bonding to the fibers of the layer of fibers 4 and/or bridges 6 extending across related openings 10 arranged in the layer of fibers 4. In a preferred variation the bridges are formed by at least partially melting the material of the first and or the second layer of plastic 2, 3.

Figure 8:
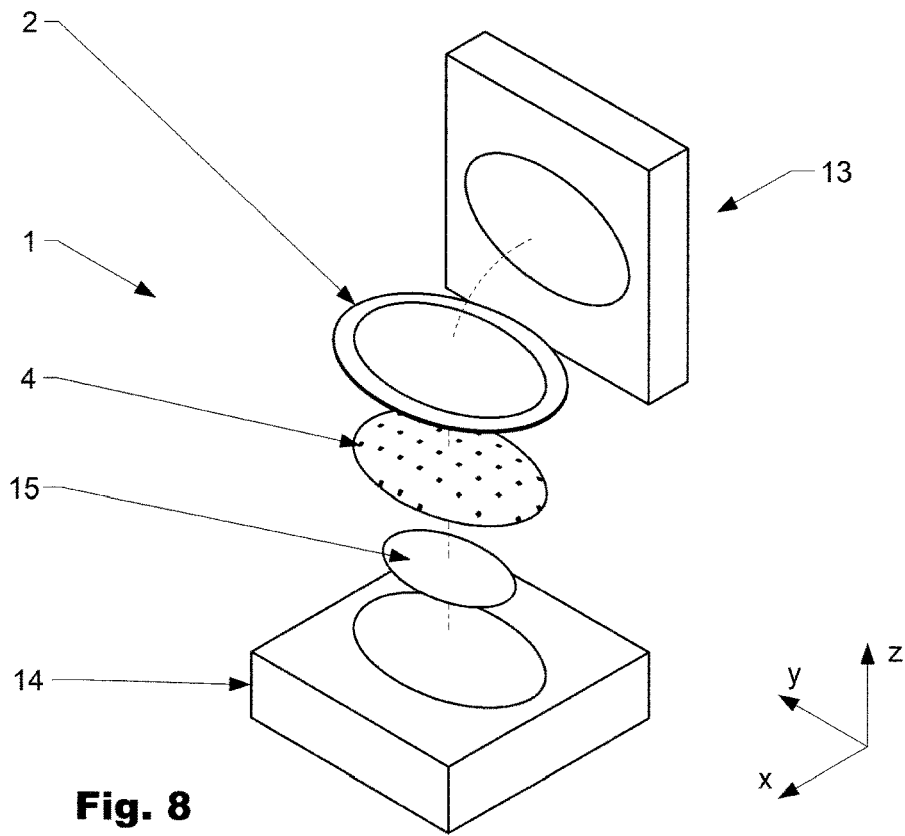
FIG. 8 A process step for making of a variation of a composite product according to the present disclosure.

FIG. 8 schematically shows process steps of a variation of a process of making an assembly as described above: A first and a second mold part 13, 14 are provided. A first layer of plastic 2 that is 3-dimensionally shaped is provided. A layer of fibers 4 is applied corresponding at least partially to the geometry of a final product to be made. As shown a layer of fibers 4 is arranged between the first layer of plastic 2 and the second mold part 14. An adhesive layer 15 is arranged between the layer of fibers 4 and the second mold part 14. The adhesive layer 15 may be a spray adhesive that is applied on at least a part of the surface of the second mold part 14. Thus, in a subsequent method step the layer of fibers 4 may be positioned and aligned properly on the second mold part 14 and temporarily be attached to the second mold part 14. In a further process step the first and the second mold part 13, 14 are brought together. In a further process step, energy is induced such that part of the first layer of plastic 2 is melted and penetrates the layer of fibers 4.

Rather, the words used in the specification are words of description rather than limitation, and it is understood that various changes may be made without departing from the Spirit and scope of the invention.

The invention claimed is:
1. A composite product comprising:
   a. a first layer of plastic;
   b. a support structure; and
   c. a layer of fibers arranged between the first layer of plastic and the support structure wherein
   d. the first layer of plastic penetrates the layer of fibers at least at certain locations such that the first layer of plastic is mechanically interconnected with the layer of fibers, and wherein
   e. at least one of the first layer of plastic and the support structure are at least partially optically transparent, such that fibers of the layer of fibers are at least partially visible from outside,
   f. the first layer of plastic and the support structure are interconnected to each other by several bridges arranged in openings extending across the layer of fibers, and
   g. the first layer of plastic is made by at least one of injection molding, deep drawing, and blow molding.

2. The composite product according to claim 1, wherein the support structure comprises a second layer of plastic.

3. The composite product according to claim 1, wherein fibers of the layer of fibers are at least partially bonded to each other by a bonding agent.

4. The composite product according to claim 1, wherein fibers of the layer of fibers comprise one or more of carbon fibers, poly-paraphenylene terephthalamide fibers, and metallic fibers.

5. The composite product according to claim 1, wherein the first layer of plastic and the support structure are bonded to each other by fibers of the layer of fibers.

6. The composite product according to claim 1, wherein the support structure comprises a second layer of plastic that is at least partially optically transparent.

7. The composite product according to claim 6, wherein a layer of plastic arranged from a viewer's point of view on the outside is more optically transparent than a layer of plastic arranged inside.

8. The composite product according to claim 1, wherein the layer of fibers comprises a network of fibers, wherein several bridges are arranged adjacent to junctions of the network of fibers.

9. The composite product according to claim 8, wherein the several bridges are arranged in at least one of a regular and irregular pattern.

10. The composite product according to claim 8, wherein the bridges are made by thermoplastic deformation of the material of at least one of the first layer of plastic and a second layer of plastic.

11. The composite product according to claim 1, wherein and the support structure is made by at least one of injection molding, deep drawing, and blow molding.

12. The composite product according to claim 1, wherein at least one adhesive layer is arranged between at least one of (i) the first layer of plastic and the layer of fibers and (ii) the support structure and the layer of fibers.

13. The composite product according to claim 1, wherein the first layer of plastic comprises protrusions that penetrate the layer of fibers.

14. A method for making of the composite product according to claim 1, the method comprising:
   a. providing the first layer of plastic;
   b. providing the layer of fibers;
   c. providing a first mold part;
   d. providing a second mold part;
   e. arranging the layer of fibers between the first layer of plastic and the second mold part;
   f. arranging the first layer of plastic between the first mold part and the second mold part;
   g. bringing together the first mold part and the second mold part; and
   h. inducing energy such that a part of the first layer of plastic penetrates the layer of fibers.

15. The method for making the composite product according to claim 14, further comprising:
   a. providing a support structure comprising a second layer of plastic;
   b. arranging the layer of fibers between the first layer of plastic and the second layer of plastic; and
   c. interconnecting the first layer of plastic and the second layer of plastic across the layer of fibers.

16. The method for making the composite product according to claim 15, wherein a chemical bond interconnects the first layer of plastic and the second layer of plastic with each other.

17. The method for making the composite product according to claim 14, further comprising: arranging an adhesive layer on one side of the layer of fibers.

18. The method for making the composite product according to claim 14, further comprising: applying a support structure to the layer of fibers by means of injection molding.

19. The method according to claim 14, wherein inducing energy such that the part of the first layer of plastic that penetrates the layer of fibers extending bridges between the first layer of plastic and a second layer of plastic in openings in the layer of fibers thereby bonding the first layer of plastic and the second layer of plastic together.

* * * * *